(12) United States Patent
Kao

(10) Patent No.: US 8,497,872 B2
(45) Date of Patent: *Jul. 30, 2013

(54) WHITE BALANCE CORRECTION METHOD

(75) Inventor: Hsu-Pin Kao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 590 days.

This patent is subject to a terminal disclaimer.

(21) Appl. No.: 12/755,475

(22) Filed: Apr. 7, 2010

(65) Prior Publication Data

US 2010/0259551 A1  Oct. 14, 2010

(30) Foreign Application Priority Data

Apr. 8, 2009  (CN) .......................... 2009 1 0301388

(51) Int. Cl.
*G09G 5/02* (2006.01)

(52) U.S. Cl.
USPC ........... 345/589; 345/590; 345/600; 345/601; 348/254; 348/655; 348/674

(58) Field of Classification Search
None
See application file for complete search history.

(56) References Cited

U.S. PATENT DOCUMENTS

| 7,688,328 B2 * | 3/2010 | Chen et al. ..................... 345/589 |
| 7,808,462 B2 * | 10/2010 | Tanase et al. ................... 345/83 |
| 8,294,827 B2 * | 10/2012 | Kao .............................. 348/658 |

FOREIGN PATENT DOCUMENTS

CN 1845232 A 10/2006

\* cited by examiner

*Primary Examiner* — Antonio A Caschera
(74) *Attorney, Agent, or Firm* — Altis Law Group, Inc.

(57) ABSTRACT

A method for correcting the white balance of a display by: setting a target color coordinates of a target white point at a predetermined color temperature and a group of gray levels in response to an user input command; constructing R, G, B images according to the group gray levels; measuring the luminance and corresponding color coordinates of the R, G, B based on the R, G, B images; selecting one color of R, G, B to be a base color and the other two colors to be adjustable colors; fixing the measured luminance of the base color; estimating target luminance of the two adjustable color based on the measured luminance of the base color; estimating the adjusted gray levels of the two adjustable colors based on estimated luminance of the adjustable colors and the Gamma table; and reconstructing the Gamma table based on the estimated adjusted gray levels of the two adjustable colors.

14 Claims, 6 Drawing Sheets

Table of Contents

WHITE BALANCE CORRECTION METHOD

BACKGROUND

1. Technical Field

The present disclosure relates to a technique for setting display parameters, and particularly to a white balance correction method for a display.

2. Description of Related Art

Usually when setting the white balance of a display, a user will manually adjust the intensity of the red, green, and blue color components of the display by using a colorimeter and a color-difference meter. That is, settings are done manually using the user subjective judgment to adjust the colors using the color image on the screen and the reference color data provided by the colorimeter and color-difference meter.

However, it is difficult or at least troublesome to adjust white balance by using the above mentioned method.

Therefore, a simple white balance correction method is desired.

BRIEF DESCRIPTION OF THE DRAWINGS

Many aspects of the embodiments can be better understood with reference to the following drawing. The vector components in the drawing are not necessarily drawn to scale, the emphasis instead being placed upon clearly illustrating the principles of the present embodiments.

DETAILED DESCRIPTION

Figure 1:
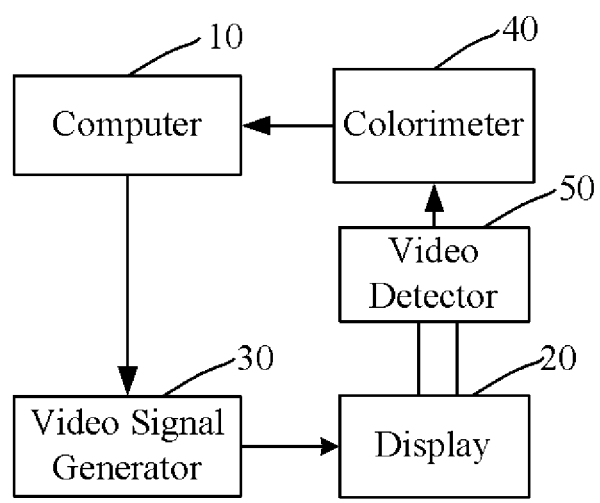
FIG. 1 illustrates a white balance correction system in accordance with an exemplary embodiment.

Referring to FIG. 1, a white balance correction system 100 is shown in accordance with an exemplary embodiment. The white balance correction system 100 includes a computer 10, a display 20, a video signal generator 30, a colorimeter 40, and a video detector 50. The display 20 may be a TV, such as a PDP TV, an LCD TV, an LED TV, and so on. The display 20 may also be a monitor, such as a CRT monitor, an LCD monitor, an LED monitor, and so on.

The computer 10 is configured to perform a white balance correction method to control the video signal generator 30 and the colorimeter 40. For example, under the control of the computer 10, the video signal generator 30 generates RGB signals having pre-determined gray levels ranging from 0 to 255 as input to the display 20. For example, to check performance of red output of the display, an RGB signal comprising (255, 0, 0) gray levels is sent to the display 20 and image parameters measured. The green is checked using (0, 255, 0) and then blue is checked using (0, 0, 255). The output of the display 20, in other words the image formed, is examined for gray levels which are then compared to the input levels and appropriate corrections made. A Gamma table is pre-set in the display 20, for storing corrective action associated with relationships between input gray levels and output gray levels of the display 20. Under the control of the computer 10, the colorimeter 40 measures the color image to obtain luminance (or brightness) of the RGB components of the image as well coordinates of the RGB components in CIE XYZ color space and then transmits the measurements to the computer 10 for processing to obtain output gray levels.

Based on the measured luminance and coordinates, the computer 10 is further configured to perform the white balance correction method by calculating adjusted gray level settings of the display 20 to achieve the correct output, that is, an image displayed matching the image input. The adjustments required are used to complete the Gamma table of the display 20, as a result the display 20 can maintain an output image with an optimum gray level white balance to reduce color deviation and display colors of the image close to the actual original color. For example, gray levels of a displayed red image may be (243, 0, 5) instead of the input (255, 0, 0), and after adjustments are calculated, the internal settings of the display 20 may need to be set to (215, 0, 12) to achieve an output of (255, 0, 0) and are associated in the Gamma table as such. In other words the Gamma table is used to record how to adjust the response of the display 20 to input signals to achieve desired output signals.

Figure 2:
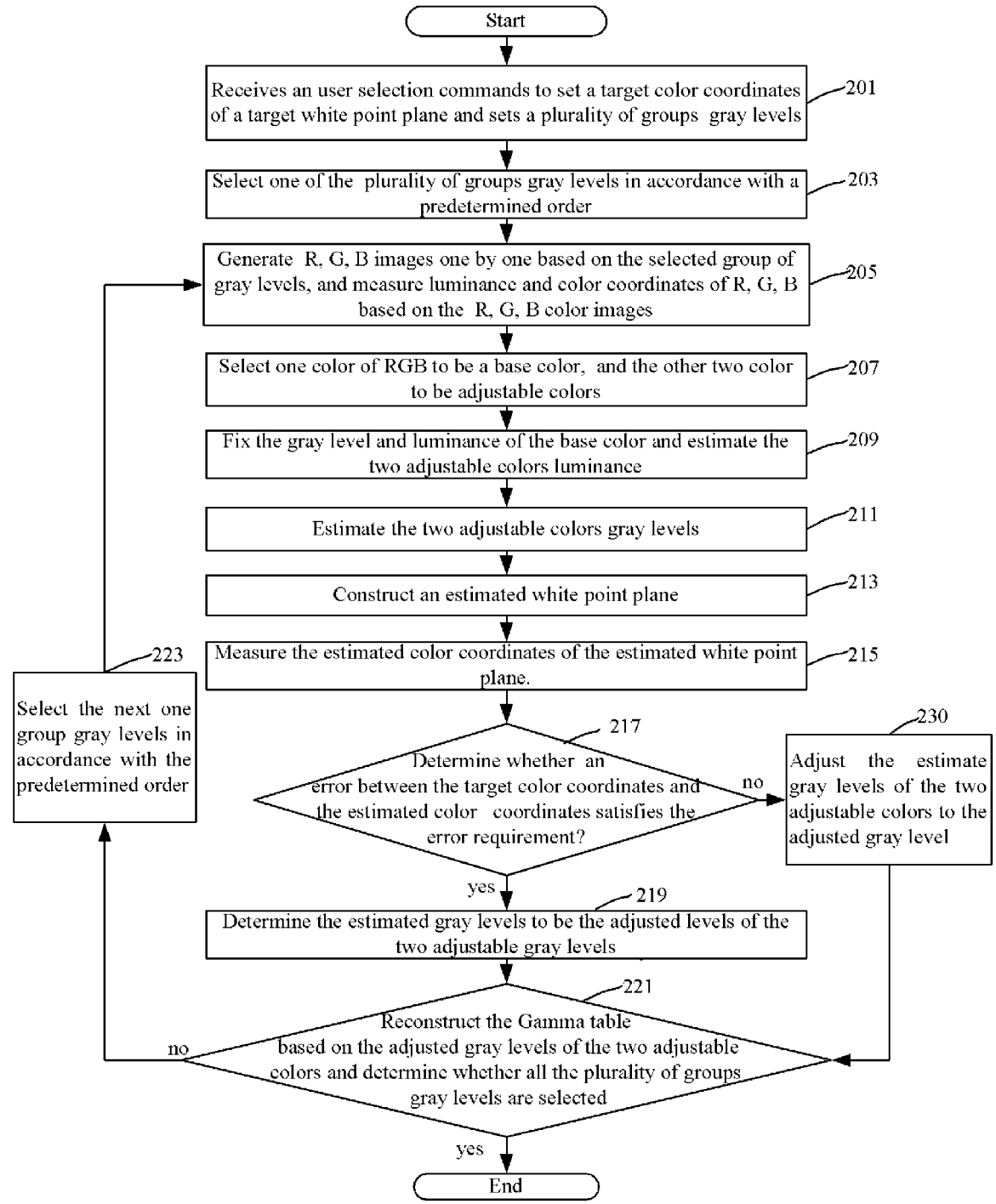
FIG. 2 illustrates a flowchart of white balance correction method in accordance with an exemplary embodiment.

Referring to FIG. 2, a flowchart of a white balance correction method is shown in accordance with an exemplary embodiment. In this embodiment, the white balance correction method is stored within the computer 10 as software. In another embodiment, the white balance correction method is configured within the computer 10 as firmware on a chip. The white balance correction method includes following steps.

In step 201, the computer 10 receives a user selection command manually to set a target color coordinates $W_T(x_T, y_T)$ of a target white point of a target white point plane and sets a plurality of gray level groups. The $W_T(x_T, y_T)$ is for various color temperatures. For example, in the CIE-XYZ color space, when the color temperature is 9300K, the computer 10 sets the color coordinates of the target white point to $W_T(0.285, 0.293)$. Each group of gray levels corresponds to three sets of gray levels corresponding respectively to three input images, such as a red image, a green image, and a blue image. For example, three groups gray levels, corresponding to three sets of gray levels, such as "$GLr_0$, $GLg_0$, $GLb_0$", "$GLr_0^1$, $GLg_0^1$, $GLb_0^1$", and "$GLr_0^2$, $GLg_0^2$, $GLb_0^2$", are set. The ratio of each group of gray levels of the RGB components is 1. For example, values of $GLr_0$:$GLg_0$:$GLb_0$ are set at a ratio of 1:1:1, $GLr_0^1$:$GLg_0^1$:$GLb_0^1$ values are 1:1:1, and $GLr_0^2$:$GLg_0^2$:$GLb_0^2$ values are 1:1:1. The gray levels groups' number also can be reduced or increased based on requirements of the white balance precision. For example, when more gray levels are set, the better white balance achieve, but at a cost of more time.

In step 203, the computer 10 selects one of the plurality of groups of gray levels in accordance with a predetermined order. In this embodiment, the predetermined order is "$GLr_0$, $GLg_0$, $GLb_0$", "$GLr_0^1$, $GLg_0^1$, $GLb_0^1$", and "$GLr_0^2$, $GLg_0^2$, $GLb_0^2$". In other words, the computer 10 first selects the group of gray levels "$GLr_0$, $GLg_0$, $GLb_0$".

In step 205, the computer 10 based on the selected gray levels, controls the video generator 30 to generate a group of gray levels of a red image, a green image, and a blue image one by one to form monochrome images on the display 20, and controls the colorimeter 40 to measure luminance and color coordinates of the primary color images via the video detector 50. For example, the video generator 30 firstly generates the gray levels ($GLr_0$, 0, 0) to form a red image on the display 20, secondly generates the gray levels (0,$GLg_0$,0) to form a green image on the display 20, and lastly generates the gray levels (0, 0, GLb$_0$) to form a blue image. Likewise, the colorimeter 40 first measures the luminance m$_1$ and color coordinates R(x$_1$,y$_1$) of the red image, secondly measures the luminance m$_2$ and color coordinates G(x$_2$,y$_2$) of the green image, and lastly measures the luminance m$_3$ and color coordinates B(x$_3$,y$_3$) of the blue image.

In step 207, the computer 10 selects one color of the three colors R, G, B to be a base color, and the other two color to be adjustable colors. For example, the computer 10 selects the red color R to be the base color as well selects the green color G and the blue color B to be the two adjustable colors.

In step 209, the computer 10 fixes the gray level/the luminance of the base color R, and estimates the two adjustable colors G, B luminance m$_2^1$ and m$_3^1$ of the other two adjustable colors G, B. For example, the computer 10 determines the measured luminance of the base color R to be a target luminance of the base color R, such that, the adjustment requirement of the base color R of the display 20 is satisfied. And then the computer 20 estimates the luminance m$_2^1$ and m$_3^1$ of the two adjustable colors G, B based on the target luminance m$_1$ of the based color R, and the measured color coordinates R(x$_1$, y$_1$), G(x$_2$, y$_2$), B(x$_3$,y$_3$), and the target color coordinates W$_T$(X$_T$, y$_T$) of the target white point according to following expression (1)~(2).

$$m_2^1 = \frac{m_1 y_2}{y_1} \times \frac{\frac{x_T - x_1}{x_T - x_3} - \frac{y_T - y_1}{y_T - y_3}}{\frac{y_T - y_2}{y_T - y_3} - \frac{x_T - x_2}{x_T - x_3}} \quad (1)$$

$$m_3^1 = \frac{m_1 y_3}{y_1} \times \frac{\frac{x_T - x_1}{x_T - x_2} - \frac{y_T - y_1}{y_T - y_2}}{\frac{y_T - y_3}{y_T - y_3} - \frac{x_T - x_3}{x_T - x_2}} \quad (2)$$

In step 211, the computer 10 estimates gray levels value GLg$_1$,GLb$_1$ of the two adjustable colors G, B based on the estimated luminance m$_2^1$,m$_3^1$ of adjustable colors G, B and a Gamma value in the Gamma table according to a following expression (3).

$$GL = 255 \times \left(\frac{m}{Y_{max}}\right)^{1/T} \quad (3)$$

In the expression (3), m indicates estimated luminance of one of the two adjustable colors, Y$_{max}$ indicates max luminance of the one of the two adjustable colors G, B, such as the gray level of the one of the two adjustable are 255. The max luminance of the two adjustable colors G, B can be determined by actual experiments. T indicates the Gamma value, the Gamma value is in a range from 2.0 to 2.4. In this embodiment, the gamma value is 2.2.

Based on the expression (3), the luminance GLg$_1$ of the adjustable color G and the luminance GLb$_1$ of adjustable color B can be obtained:

$$GLg_1 = 255 \times \left(\frac{m_2^1}{Y_{max}}\right)^{1/T} \quad (4)$$

$$GLb_1 = 255 \times \left(\frac{m_3^1}{Y_{max}}\right)^{1/T} \quad (5)$$

Further the Gamma value can be used to efficiently reduce the quantity of measuring data to estimate the luminance of the two adjustable colors G, B.

In step 213, the computer 10 controls the video signal generator 30 to generate the gray level of the base color R and the estimated gray levels of the two adjustable colors R, G to construct an estimated white point plane on the display 20.

In step 215, the computer 10 controls the colorimeter 40 to measure the estimated color coordinates W$_C$(x$_C$,y$_C$) of an estimated white point of the estimated white point plane.

In step 217, the computer 10 calculates an error Δxy between the target color coordinates W$_T$(x$_T$,y$_T$) of a target white point and the estimated color coordinates W$_C$(x$_C$,y$_C$) of estimated white point, and determines whether the error Δxy satisfies an error requirement. The error is expressed as:

$$\Delta xy = \sqrt{(x_T - x_C)^2 + (y_T - y_C)^2} \quad (6)$$

For example, if the error Δxy is smaller than a predetermined value, the error Δxy is determined satisfying the error requirement. If the error Δxy is greater than the predetermined value, the error is determined to not satisfy the error requirement.

In step 219, if the error Δxy satisfies the error requirement, the computer 10 determines the estimated gray levels to be adjusted gray levels of the two adjustable colors G, B.

In step 221, the computer recalculates the Gamma table based on the adjusted gray levels of the two adjustable colors G, B, and determines whether all the plurality of the groups of the gray levels are selected.

In step 223, if not all of the plurality of the groups of the gray levels have been selected, the procedure goes back to step 203 to select another one of the plurality of groups of gray levels until all the plurality of the groups of gray levels have been selected and the Gamma table is complete.

In step 230, if the error does not satisfy the predetermined error, the computer 10 adjusts the estimated gray levels of the two adjustable colors G, B to the adjusted gray levels based on measured coordinates of the two adjustable colors, the estimated coordinates of the estimated white point, and the target coordinates of the target white point, and then performs the step 221. How the computer 10 adjusts the estimated gray levels of the two adjustable colors G, B to the adjusted gray levels will be described below in following two methods.

Figure 3:
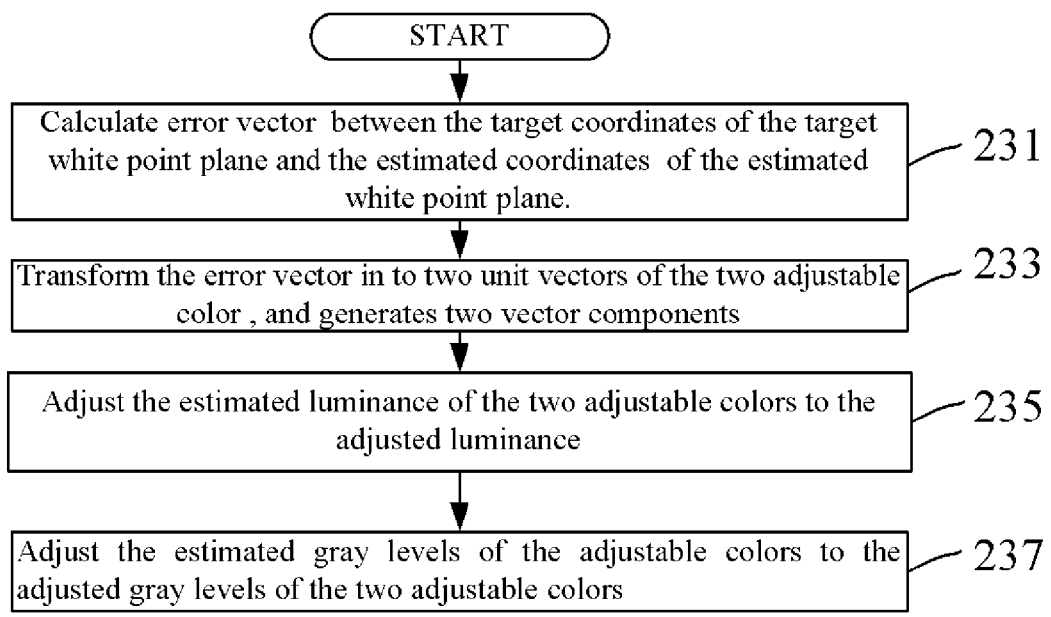
FIG. 3 illustrates a flowchart of a sub-method for the white balance correction method in FIG. 2 in accordance with a first exemplary embodiment.

Referring to FIG. 3, a flowchart of a first method of adjustment of the estimated gray levels of the two adjustable colors G, B in step 230 is shown. The first method includes following steps.

Figure 5:
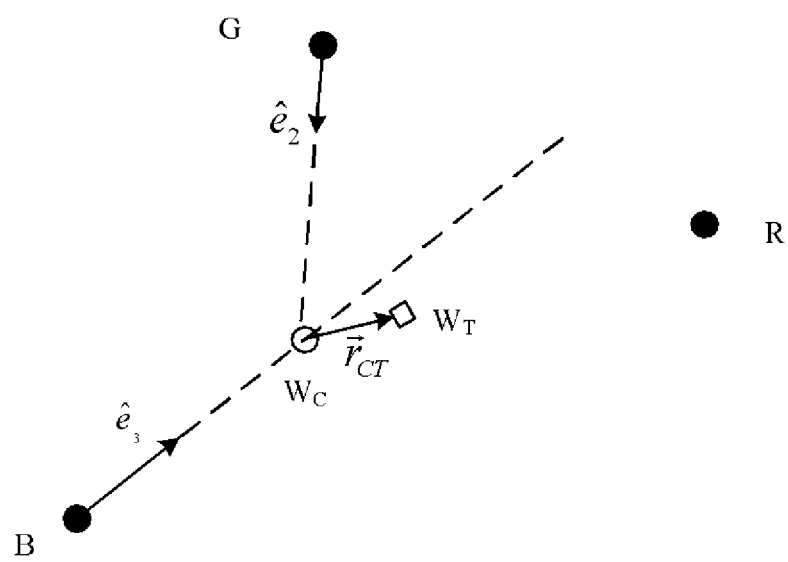
FIGS. 5 and 6 illustrates position relationship between R, G, B color coordinates, a target white point color coordinates, and an estimation white point color coordinates in accordance with an exemplary embodiment.

In step 231, the computer 10 calculates an error vector $\vec{r}_{CT}$ between the target coordinates W$_T$(x$_T$,y$_T$) of the target white point and the estimated coordinates W$_T$(x$_T$,y$_T$) of the estimated white point. Referring to FIG. 5, the error vector can be expressed as:

$$\vec{r}_{CT} = (x_T - x_C)\hat{i} + (y_T - y_C)\hat{j} \quad (7)$$

Figure 6:
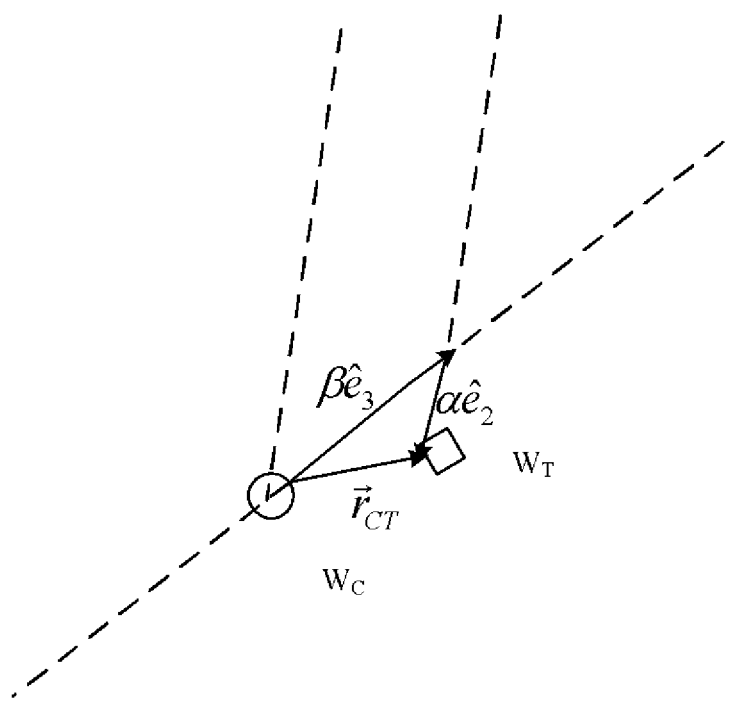

In step 233, the computer 10 transforms the error vector $\vec{r}_{CT}$ into two unit vectors ê$_2$ and ê$_3$ of the two adjustable color by a transformation, and generates two vector components α, β of the two unit vectors ê$_2$ and ê$_3$. Referring to FIG. 6, transformation can be expressed as:

$$\vec{r}_{CT} = \alpha \hat{e}_2 + \beta \hat{e}_3 \quad (8)$$

$$\hat{e}_2 = \frac{\vec{r}_{GC}}{|\vec{r}_{GC}|}, \vec{r}_{GC} = (x_C - x_G)\hat{i} + (y_C - y_G)\hat{j} \quad (9)$$

$$\hat{e}_3 = \frac{\vec{r}_{BC}}{|\vec{r}_{BC}|}, \vec{r}_{BC} = (x_C - x_B)\hat{i} + (y_C - y_B)\hat{j} \quad (10)$$

In step 235, the computer 10 adjusts the estimated luminance of the two adjustable colors G, B to target luminance based on a relationship between the unit vectors $\hat{e}_2$ and $\hat{e}_3$ and luminance of the two adjustable colors G, B. As shown in FIGS. 5 and 6, when α or β is a positive value, the luminance of G or B must be reduced, while α or β is negative value, the luminance of G or B must be increased. The adjustment of the luminance of G or B can be determined by actual experiments. For example, in the gray level 50, the luminance of B is reduced by 10%, an adjustment of a vector component of the unit vector $\hat{e}_3$ is 0.0085. When α is 0.33768, the luminance of G must be reduced by 19.8%. Further, the adjustment of the estimated luminance of G or B can be also determined by following expression (11) based on the estimated color coordinates $W_C(x_C,y_C)$ of the estimated white point, determined target luminance $m_1$, the measured R, G, B color coordinates $R(x_1,y_1)$, $G(x_2,y_2)$, $B(x_3,y_3)$. The expression is expressed as below:

$$m_2^2 = \frac{m_1 y_2}{y_1} \times \frac{\frac{x_C - x_1}{x_C - x_3} - \frac{y_C - y_1}{y_C - y_3}}{\frac{y_C - y_2}{y_C - y_3} - \frac{x_C - x_2}{x_C - x_3}} \quad (11)$$

$$m_3^2 = \frac{m_1 y_3}{y_1} \times \frac{\frac{x_C - x_1}{x_C - x_2} - \frac{y_C - y_1}{y_C - y_2}}{\frac{y_C - y_3}{y_C - y_2} - \frac{x_C - x_3}{x_C - x_2}} \quad (12)$$

Based on the expression (11), a quantity of the adjustment of the G luminance is $m_2^1 - m_2^2$, as a result, when the quantity of the adjustment of the luminance is the unit of luminance, the quantity adjustment of the vector component of the unit vector $\hat{e}_2$ is $$\frac{\alpha}{m_2^1 - m_2^2}.$$

Likewise, when a quantity of adjustment of the luminance is the unit of luminance, the quantity of adjustment of the vector component of the unit vector $$\frac{\beta}{m_3^1 - m_3^2}.$$

So the target luminance of the two adjustable colors G, B can be obtained based the relationship between the luminance and the vector components α, β of the two unit vectors $\hat{e}_2$, $\hat{e}_3$ of the two adjustable colors.

In step 237, the computer 10 adjusts the estimated gray levels of the two adjustable colors G, B to the adjusted gray levels of the two adjustable colors G, B based on the target luminance of the two adjustable colors G, B according to the expression (3).

Figure 4:
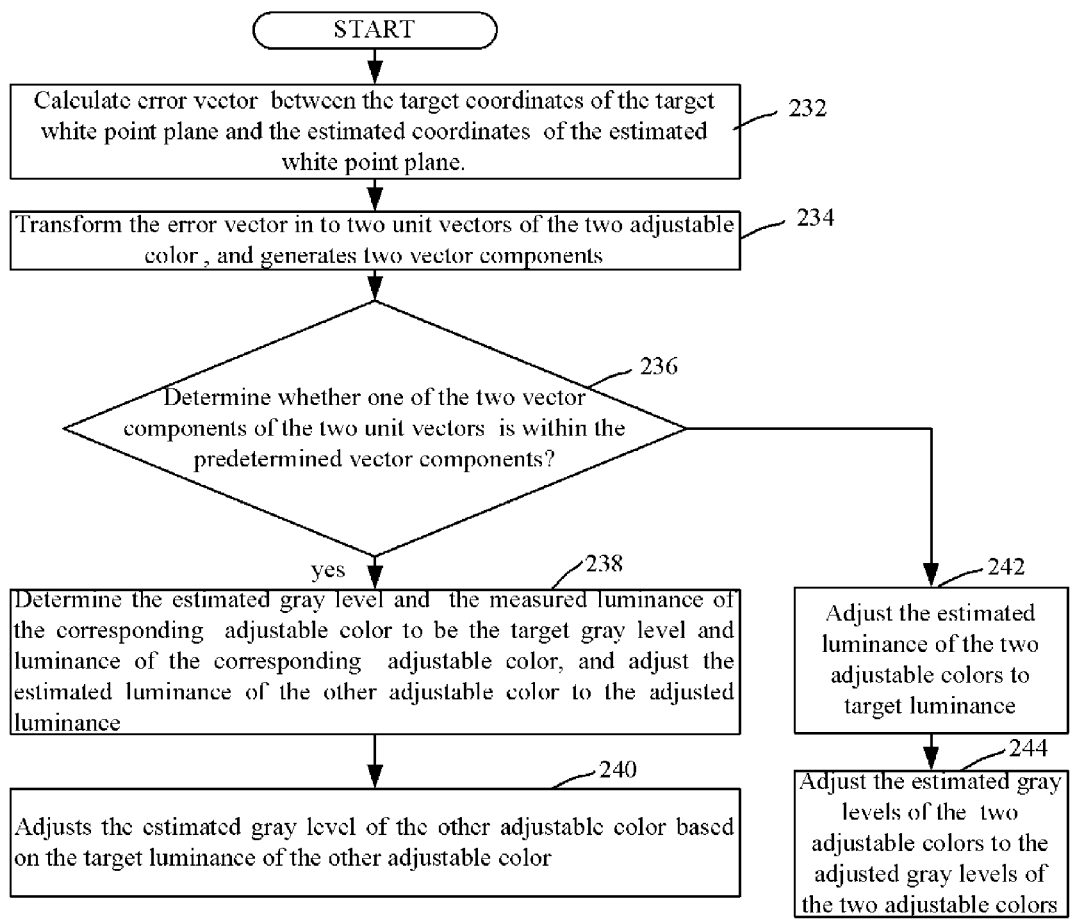
FIG. 4 illustrates a flowchart of a sub-method for the white balance correction method in FIG. 2 in accordance with a second exemplary embodiment.

Referring FIG. 4, a flowchart of a second method of adjustment of the estimated gray levels of the two adjustable colors G, B in step 230 is shown. The second method includes following steps.

In step 232, the computer 10 calculates error vector $\vec{r}_{CT}$ between the target coordinates $W_T(x_T,y_T)$ of the target white point and the estimated coordinates $W_C(x_C,y_C)$ of the estimated white point. Referring to FIG. 5, the error vector can be expressed as:

$$\vec{r}_{CT} = (x_T - x_C)\hat{i} + (y_T - y_C)\hat{j} \quad (7)$$

In step 234, the computer 10 transforms the error vector $\vec{r}_{CT}$ into two unit vectors $\hat{e}_2$ and $\hat{e}_3$ of the two adjustable color B,G, and generates two vector components α and β of the two unit vectors $\hat{e}_2$ and $\hat{e}_3$. Referring to FIG. 6, transformation can be expressed as:

$$\vec{r}_{CT} = \alpha \hat{e}_2 + \beta \hat{e}_3 \quad (8)$$

$$\hat{e}_2 = \frac{\vec{r}_{GC}}{|\vec{r}_{GC}|}, \vec{r}_{GC} = (x_C - x_G)\hat{i} + (y_C - y_G)\hat{j} \quad (9)$$

$$\hat{e}_3 = \frac{\vec{r}_{BC}}{|\vec{r}_{BC}|}, \vec{r}_{BC} = (x_C - x_B)\hat{i} + (y_C - y_B)\hat{j} \quad (10)$$

In step 236, the computer 10 determines whether one of the two vector components α and β of the two unit vectors $\hat{e}_2$ and $\hat{e}_3$ is within a corresponding predetermined vector component.

In step 238, if one of the two vector components α and β of the two unit vectors $\hat{e}_2$ and $\hat{e}_3$ is within the predetermined vector component, the computer 10 determines the gray level and the measured luminance which corresponding to the one vector component to be the adjusted gray level and a target luminance, and adjusts the estimated luminance of the other adjustable color luminance to be the target luminance based on a relationship between the unit vector and luminance of the other adjustable colors. How to obtain the target luminance of the other adjustable color can be seen from step 235 above.

In step 240, the computer 10 adjusts the estimated gray level of the other adjustable color based on the target luminance of the other adjustable color according to the expression (3).

In step 242, if none of the two vector components α and β of the two unit vectors $\hat{e}_2$ and $\hat{e}_3$ is within the predetermined vector components, the computer 10 adjusts the estimated luminance of the two adjustable colors G, B to the target luminance. How to obtain the target luminance of the other adjustable color can also be seen in step 235 above.

In step 244, the computer 10 adjusts the estimated gray levels of the two adjustable colors G, B to the adjusted gray levels of the two adjustable colors G, B based on the target luminance of the two adjustable colors G, B according to the expression (3).

As described above, the white balance correction method can be performed by the computer, therefore, it can reduce the labor cost, and a plurality of displays of the same type can reproduce colors of images close to each other. Further, the white balance correction method can be greatly simplified to correct the white balance of the display by adjusting two colors of R, G, B.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A white balance correction method for implementation by a white balance correction system, the white balance system comprising a computer, a video signal generator, a colorimeter, a video detector, and a display all under control of the computer, the display comprising a Gamma table for storing corrective action associated with relationships between input gray levels and output gray levels of the display, the video signal generator configured to generate RGB signals having pre-determined gray levels to form color images on the display, the colorimeter configured to measure luminance and coordinates of the corresponding color images via the video detector; the white balance correction method comprising:

setting target color coordinates of a target white point at a predetermined color temperature and a group of gray levels as the input gray levels in response to a first user input command on the computer;

constructing R, G, B images on the display according to the group of gray levels;

measuring luminance and color coordinates of the R, G, B images by the colorimeter based on the corresponding R, G, B images;

selecting one color of R, G, B images to be a base color and the other two colors to be adjustable colors in response to a second user input command on the computer;

fixing the gray level of the base color in response to a third user input command on the computer;

estimating target luminance of the two adjustable colors by the computer based on the measured luminance of the base color;

estimating the adjusted gray levels of the two adjustable colors by the computer based on estimated luminance of the adjustable colors and the Gamma table; and reconstructing the Gamma table of the display by the computer based on the estimated adjusted gray levels of the two adjustable colors.

2. The white balance correction method of claim 1, wherein before reconstructing the Gamma table, the white balance method further comprises:

constructing an estimated white point plane based on the gray level of the base color and the estimated adjusted gray levels of the two adjustable colors;

measuring estimated color coordinates of an estimated white point of the estimated white point plane;

determining whether an error between the target color coordinates and the estimated color coordinates satisfies an error requirement;

if the error does not satisfies the error requirement, adjusting the estimated adjusted gray levels of the adjustable color to the adjusted gray levels.

3. The white balance correction method of claim 2, wherein adjusting the estimated gray levels of the two adjustable colors to the adjusted gray level comprising:

calculating an error vector between the target coordinates of the target white point plane and the estimated coordinates of the estimated white point plane;

transforming the error vector into two unit vectors of the two adjustable colors, and generating two vector components;

re-estimating the target luminance of the two adjustable colors based on the two unit vectors and the vector components; and adjusting the estimated gray levels of the two adjustable colors to the adjusted gray levels of the two adjustable colors.

4. The white balance correction method of claim 2, wherein adjusting the estimated gray levels of the two adjustable colors to target gray level comprising:

calculating error vector between the target coordinates of the target white point plane and the estimated coordinates of the estimated white point plane;

transforming the error vector into two unit vectors of the two adjustable colors, and generates two vector components;

determining whether one of the two vector components of the two unit vectors is within a predetermined vector component;

if one of the two vector components is within the predetermined vector component, fixing the measured luminance of the corresponding adjustable color, and re-estimating luminance of the other adjustable color to target luminance;

adjusting the estimated gray levels of the two adjustable colors to the adjusted gray levels based on the estimated luminance of the two adjustable colors.

5. The white balance correction method of claim 4, wherein the transformation between the error vector and the two unit vectors of the two adjustable colors is expressed as:

$$\bar{r}_{CT} = \alpha \hat{e}_2 + \beta \hat{e}_3;$$

$$\hat{e}_2 = \frac{\bar{r}_{GC}}{|\bar{r}_{GC}|}, \bar{r}_{GC} = (x_C - x_G)\hat{i} + (y_C - y_G)\hat{j};$$

$$\hat{e}_3 = \frac{\bar{r}_{BC}}{|\bar{r}_{BC}|}, \bar{r}_{BC} = (x_C - x_B)\hat{i} + (y_C - y_B)\hat{j};$$

Wherein $(x_C, y_C)$ indicates the color estimated coordinates of the estimated coordinates of estimated white point, $(x_B, y_B)$ and the $(x_G, y_G)$ indicate the color coordinates of the two adjustable colors, $\bar{r}_{GC}$ and $\bar{r}_{CT}$ indicate the error vector, $\hat{e}_2$, $\hat{e}_3$ indicate the two unit vectors of the two adjustable colors, $\alpha$ and $\beta$ indicate the two vector components of the two unit vectors.

6. The white balance correction method of claim 5, wherein re-estimating target luminance of the adjustable color can be obtain based on a relationship between the unit vector and the luminance of the adjustable color, the relationship can be expressed as:

$$\frac{\alpha}{m_2^1 - m_2^2}$$

$$m_2^2 = \frac{m_1 y_2}{y_1} \times \frac{\frac{x_C - x_1}{x_C - x_3} - \frac{y_C - y_1}{y_C - y_3}}{\frac{y_C - y_2}{y_C - y_3} - \frac{x_C - x_2}{x_C - x_3}},$$

wherein $(x_1, y_1)$, $(x_2, y_2)$, $(x_3, y_3)$ indicate the measured color coordinates of the base color and the two adjustable colors, $m_1$ indicates the measured luminance of the base color, $m_2^2$ indicates the estimated luminance of the adjusted color, $m_2$ indicates actual luminance of the estimated white point, $$\frac{\alpha}{m_2^1 - m_2^2}$$

indicates a quantity adjustment of the vector component of the adjustable color when the quantity adjustment of the luminance is the unit of the luminance.

7. The white balance correction method of claim 1, wherein the luminance of the two adjustable colors can be obtain according to expressions:

$$m_2^1 = \frac{m_1 y_2}{y_1} \times \frac{\frac{x_T - x_1}{x_T - x_3} - \frac{y_T - y_1}{y_T - y_3}}{\frac{y_T - y_2}{y_T - y_3} - \frac{x_T - x_2}{x_T - x_3}},$$

$$m_3^1 = \frac{m_1 y_3}{y_1} \times \frac{\frac{x_T - x_1}{x_T - x_2} - \frac{y_T - y_1}{y_T - y_2}}{\frac{y_T - y_3}{y_T - y_2} - \frac{x_T - x_3}{x_T - x_2}}$$

Wherein $m_1$ indicates the measured luminance of the base color, $m_2^1$ and $m_3^1$ indicates the estimated target luminance of the two adjustable colors, $(x_1, y_1)$, $(x_2, y_2)$, $(x_3, y_3)$ indicate the measured color coordinates of the base color and the two adjustable colors, $(x_T, y_T)$ indicates the target color coordinates.

8. A white balance correction method for adjusting the white balance of the display, the display comprising a Gamma table for storing corrective action associated with relationships between input gray levels and output gray levels of the display, the white balance correction method comprising:
setting target color coordinates of a target white point at a predetermined color temperature and a group of gray levels as the input gray levels in response to a first user input command on a computer;
constructing R, G, B images on the display according to the group of gray levels;
measuring the luminance and corresponding color coordinates of the R, G, B images by a colorimeter based on the corresponding R, G, B images;
selecting one color of R, G, B images to be a base color and the other two colors to be adjustable colors in response to a second user input signal on the computer;
fixing the gray level and measured luminance of the base color in response to a third user input signal on the computer;
estimating target luminance of the two adjustable colors by the computer based on the measured luminance of the base color;
estimating the adjusted gray levels of the two adjustable colors by the computer based on estimated luminance of the adjustable colors and the Gamma table; and
reconstructing the Gamma table of the display by the computer based on the estimated adjusted gray levels of the two adjustable colors.

9. The white balance correction method of claim 8, wherein before reconstructing the Gamma table, the white balance method further comprises:
constructing an estimated white point plane based on the gray level of the base color and the estimated adjusted gray levels of the two adjustable colors;
measuring estimated color coordinates of an estimated white point of the estimated white point plane;
determining whether an error between the target color coordinates and the estimated color coordinates satisfies an error requirement;
if the error does not satisfies the error requirement, adjusting the estimated adjusted gray levels of the adjustable color to the adjusted gray levels.

10. The white balance correction method of claim 9, wherein adjusting the estimated gray levels of the two adjustable colors to the adjusted gray level comprising:
calculating an error vector between the target coordinates of the target white point plane and the estimated coordinates of the estimated white point plane;
transforming the error vector into two unit vectors of the two adjustable colors, and generating two vector components;
re-estimating the target luminance of the two adjustable colors based on the two unit vectors and the vector components; and
adjusting the estimated gray levels of the two adjustable colors to the adjusted gray levels of the two adjustable colors.

11. The white balance correction method of claim 9, wherein adjusting the estimated gray levels of the two adjustable colors to target gray level comprising:
calculating error vector between the target coordinates of the target white point plane and the estimated coordinates of the estimated white point plane;
transforming the error vector into two unit vectors of the two adjustable colors, and generates two vector components;
determining whether one of the two vector components of the two unit vectors is within a predetermined vector component;
if one of the two vector components is within the predetermined vector component, fixing the measured luminance of the corresponding adjustable color, and re-estimating luminance of the other adjustable color to target luminance;
adjusting the estimated gray levels of the two adjustable colors to the adjusted gray levels based on the estimated luminance of the two adjustable colors.

12. The white balance correction method of claim 11, wherein the transformation between the error vector and the two unit vectors of the two adjustable colors is expressed as:

$$\bar{r}_{CT} = \alpha \hat{e}_2 + \beta \hat{e}_3;$$

$$\hat{e}_2 = \frac{\bar{r}_{GC}}{|\bar{r}_{GC}|}, \bar{r}_{GC} = (x_C - x_G)\hat{i} + (y_C - y_G)\hat{j};$$

$$\hat{e}_3 = \frac{\bar{r}_{BC}}{|\bar{r}_{BC}|}, \bar{r}_{BC} = (x_C - x_B)\hat{i} + (y_C - y_B)\hat{j};$$

wherein $(x_C, y_C)$ the estimated color coordinates of the estimated coordinates of estimated white point, $(x_B, y_B)$ and the $(x_G, y_G)$ indicates the color coordinates of the two adjustable colors, $\bar{r}_{GC}$ and $\bar{r}_{CT}$ indicate the error vector, $\hat{e}_2$, $\hat{e}_3$ indicate the two unit vectors of the two adjustable colors, $\alpha$ and $\beta$ indicate the two vector components of the two unit vectors.

13. The white balance correction method of claim 12, wherein re-estimating target luminance of the adjustable color can be obtain based on a relationship between the unit vector and the luminance of the adjustable color, the relationship can be expressed as:

$$\frac{\alpha}{m_2^1 - m_2^2}$$

-continued $$m_2^2 = \frac{m_1 y_2}{y_1} \times \frac{\frac{x_C - x_1}{x_C - x_3} - \frac{y_C - y_1}{y_C - y_3}}{\frac{y_C - y_2}{y_C - y_3} - \frac{x_C - x_2}{x_C - x_3}},$$

wherein $(x_1, y_1)$, $(x_2, y_2)$, $(x_3, y_3)$ indicate the measured color coordinates of the base color and the two adjustable colors, $m_1$ indicates the measured luminance of the base color, $m_2^2$ indicates the estimated luminance of the adjusted color, $m_2$ indicates actual luminance of the estimated white point, $$\frac{\alpha}{m_2^1 - m_2^2}$$

indicates a quantity adjustment of the vector component of the adjustable color when the quantity adjustment of the luminance is the unit of the luminance.

14. The white balance correction method of claim 8, wherein the luminance of the two adjustable colors can be obtain according to expressions:

$$m_2^1 = \frac{m_1 y_2}{y_1} \times \frac{\frac{x_T - x_1}{x_T - x_3} - \frac{y_T - y_1}{y_T - y_3}}{\frac{y_T - y_2}{y_T - y_3} - \frac{x_T - x_2}{x_T - x_3}},$$

$$m_3^1 = \frac{m_1 y_3}{y_1} \times \frac{\frac{x_T - x_1}{x_T - x_2} - \frac{y_T - y_1}{y_T - y_2}}{\frac{y_T - y_3}{y_T - y_2} - \frac{x_T - x_3}{x_T - x_2}}$$

Wherein $m_1$ indicates the measured luminance of the base color, $m_2^1$ and $m_3^1$ indicates the estimated target luminance of the two adjustable colors, $(x_1, y_1)$, $(x_2, y_2)$, $(x_3, y_3)$ indicate the measured color coordinates of the base color and the two adjustable colors, $(x_T, y_T)$ indicates the target color coordinates.

* * * * *